US012674726B2

(12) United States Patent
Wang et al.

(10) Patent No.: US 12,674,726 B2
(45) Date of Patent: Jul. 7, 2026

(54) PILE-SUPPORTED EMBANKMENT MODEL TEST DEVICE AND METHOD UNDER THE ACTION OF RAINFALL AND DRY-WET CYCLE

(71) Applicant: Zhejiang University of Technology, Hangzhou (CN)

(72) Inventors: Kangyu Wang, Hangzhou (CN); Jiahuan Ye, Hangzhou (CN); Ziliang Qiu, Hangzhou (CN); Qunchao Ma, Hangzhou (CN); Xinlong Zhou, Hangzhou (CN); Kangze He, Hangzhou (CN)

( * ) Notice: Subject to any disclaimer, the term of this patent is extended or adjusted under 35 U.S.C. 154(b) by 294 days.

(21) Appl. No.: 18/389,839

(22) Filed: Dec. 20, 2023

(65) Prior Publication Data

US 2024/0310250 A1     Sep. 19, 2024

(30) Foreign Application Priority Data

Mar. 13, 2023    (CN) .......................... 202310266226.5

(51) Int. Cl.
*G01M 99/00* (2011.01)

(52) U.S. Cl.
CPC ................................. *G01M 99/008* (2013.01)

(58) Field of Classification Search
CPC ...... G01M 99/008; E02D 33/00; G01N 33/24
See application file for complete search history.

(56) References Cited

FOREIGN PATENT DOCUMENTS

| | | | | |
|---|---|---|---|---|
| CN | 202631519 U | * | 12/2012 | |
| CN | 107144523 A | * | 9/2017 | ........... G01N 17/002 |
| CN | 108508141 A | * | 9/2018 | ............ G01N 33/00 |
| CN | 109440837 A | * | 3/2019 | ............ E02D 33/00 |
| CN | 110568155 A | * | 12/2019 | ............ G01N 33/24 |
| JP | 6279945 B2 | * | 2/2018 | |

OTHER PUBLICATIONS

CN-107144523-A (Year: 2017).*
CN-108508141-A (Year: 2018).*
CN-109440837-A (Year: 2019).*
CN-110568155-A (Year: 2019).*
JP-6279945-B2 (Year: 2018).*
CN-202631519-U (Year: 2012).*

* cited by examiner

*Primary Examiner* — Fatemeh Esfandiari Nia

(57) ABSTRACT

A pile-supported embankment model test device and method under an action of rainfall and dry-wet cycle comprises a unit model box system with adjustable model box height, a vertical reinforcement system of a model box unit block, a transverse reinforcement system of the model box unit block, a rainfall control device, and a drying system combined with voltage control and resistance wire height control; wherein the vertical reinforcement system of the model box unit block and the transverse reinforcement system of the model box unit block reinforce the unit model box system vertically and horizontally; through the rainfall control pipe and rainfall control valve of the rainfall control device, the rainwater conveying pipe can be watered at the same time to simulate rainfall. The device simulates the natural environment rainfall and drying process to study the working behavior of pile-supported embankment under the action of rainfall and dry-wet cycle.

15 Claims, 4 Drawing Sheets

6-1
6-2
6-3
6-4
6-5
6-6
6-7
6-8
6-9
} 6

3-2
3-3
3-1
3-4
} 3

4-1
4-2
} 4

2-1
2-2
2-3
2-4
} 2

7-1
7-2
7-3
} 7

1-1
1-2

1-1
1-4

1-1
1-2

5-1
5-2
5-7
5-6
5-3
5-8

5-7
5-8
5-3
5-2
5-6

5-1
5-2
5-7
5-6
5-3
5-8

PILE-SUPPORTED EMBANKMENT MODEL TEST DEVICE AND METHOD UNDER THE ACTION OF RAINFALL AND DRY-WET CYCLE

CROSS-REFERENCE TO RELATED APPLICATION

This application is based on and claims foreign priority to Chinese patent application 202310266226.5 filed on Mar. 13, 2023, the entire content of which is incorporated herein by reference.

TECHNICAL FIELD

The present invention relates to the field of geotechnical engineering, in particular to a pile-supported embankment model test device and method under the action of rainfall and dry-wet cycle, it can be used to simulate the influence of rainfall and dry-wet cycle on pile-supported reinforced embankment, it studies the characteristics of soil arching effect, bearing characteristics and settlement deformation mechanism of pile-supported reinforced embankment under rainfall and dry-wet cycle conditions, and improves the theory and construction technology of pile-supported embankment.

BACKGROUND

With China's economic development and social progress, China's high-speed railway and highway infrastructure has developed rapidly. Embankment is an important part of high-speed railway and highway infrastructure, its safety and stability directly affect the safety of high-speed railway and highway infrastructure, and play a key role in the further development of China's economy and urbanization.

China's geological form is complex and diverse, and it is difficult to avoid the construction of infrastructure such as expressways and high-speed railways in poor foundation areas, therefore, engineering problems such as insufficient bearing capacity of foundation, local instability of embankment, excessive settlement and uneven settlement occur from time to time in the above projects. As a new type of soft foundation treatment form composed of vertical piles and horizontal reinforcements, pile-supported reinforced embankment has been widely used in infrastructure construction such as expressways and high-speed railways due to its advantages of simple construction, fast progress, safety and economy.

However, in the process of construction and long-term service operation of pile-supported reinforced embankment, due to the influence of natural factors such as rainfall and groundwater level change, the soil properties in the embankment change, which in turn affects the working performance and service life of the embankment. At present, domestic and foreign experts and scholars have carried out a lot of research on the load transfer and settlement deformation of pile-supported reinforced embankment, but the research on the influence of complex environmental conditions such as rainfall and dry-wet cycle is still relatively small, and its related theory and technology still need to be improved. Compared with the theoretical analytical method and the numerical method using the established model, the calculated data have a greater dependence on the selection of calculation parameters; the engineering measurement method has high cost, high technical requirements, difficult monitoring, and great dependence on environmental conditions.

Therefore, in order to improve the relevant theoretical research on pile-supported reinforced embankments in complex environments such as rainfall and dry-wet cycles, in view of the research status that the theoretical analytical methods and numerical models cannot fully consider the actual conditions, the engineering measurement and monitoring are difficult and the cost is high, a simple and effective cost is urgently needed, there is an urgent need for a simple, effective and low-cost model test device and test method for pile-supported embankment under rainfall and dry-wet cycle.

SUMMARY

The purpose of the present invention is to provide a pile-supported embankment model test device and method under an action of rainfall and dry-wet cycle for the shortcomings of existing technology.

The purpose of the present invention is realized by the following technical scheme: the first aspect of the embodiment of the present invention provides a pile-supported embankment model test device under the action of rainfall and dry-wet cycle, including:

an unit model box system includes an unit body of the model box, an unit body tenon, an unit body tenon groove, and a bottom plate of the model box; wherein the unit body of the model box is located on a side of the bottom plate of the model box, and is spliced up layer by layer to form the unit model box system; water swelling rubber is set in the unit body tenon groove; the unit body tenon groove is located below the unit body tenon, and the unit body tenon and the unit body tenon groove are tenoned;

the vertical reinforcement system of the model box unit block includes a first welded steel and a first pair of pull steel bars; the first welded steel is welded at the top and bottom of the two sides of the plate of the unit model box system respectively, and the first welded steel is provided with a first hole; the first pair of pull steel bars passes through the first hole; a first thread is set at both ends of the first pair of pull steel bars; a first nut is installed on the first thread;

the transverse reinforcement system of the model box unit block includes a second welded steel and a second pair of pull steel bars; the second welded steel is welded on the left and right sides of the plates on both sides of the unit model box system; the second welded steel is provided with a second hole; the second pair of pull steel bars passes through the second hole, a second thread is set at both ends of the second pair of pull steel bars, a second nut is installed on the second thread;

a rainfall control device, including a rainfall control pipe, a rainwater conveying pipe, a pressure gauge, an inlet valve, and an inlet pipe; the inlet pipe is connected to the water tank; the pressure gauge and the inlet valve are installed on the inlet pipe; the rainfall control pipe is set in the inlet pipe, a side of the rainfall control pipe is connected with the rainfall control valve; and a drying system, including a fixed beam, a resistance wire, a safety box, a voltage control device, a telescopic pole, and a fixed pole; a third thread is set in the bottom of the fixed pole, the fixed pole is connected with the unit model box system through the third thread, the fixed pole is evenly set with connecting holes from top to bottom; a third hole is arranged on the bottom of the telescopic pole, after the third hole is aligned with the connecting holes, it is connected by connecting bolts; the top of the telescopic pole is detachably connected with the fixed beam; the resistance wire is evenly arranged at the bottom of the fixed beam, the safety box is installed outside the resistance wire, and the resistance wire is connected with the voltage control device.

Preferably, a side of the unit model box system is provided with drainage systems, wherein the drainage system includes a drainage valve, a drainage pipe, and a geotextile, and the drainage valve is installed on the drainage pipe.

Preferably, the number of drainage systems is greater than or equal to 2, and one drainage system of the drainage systems is located at the bottom of the side of the unit model box system, and the remaining drainage systems are located at different heights on the side of the unit model box system.

Preferably, a moving system is arranged at the bottom of the model box bottom plate, the moving system includes a roller baffle, a fixed hole and a roller; the roller is installed on the roller baffle, and the fixed hole is located in the center of the roller baffle.

Preferably, an inlet channel is set inside the inlet pipe, a rainwater conveying channel is set inside the rainwater conveying pipe, when the rainfall control valve is opened, the water inlet channel is connected with the rainwater conveying channel; when the rainfall control valve is closed, the water inlet channel is disconnected from the rainwater conveying channel.

Preferably, rainfall holes are uniformly arranged at the bottom of the rainwater conveying pipe; an installation thread is arranged at the connection between the rainfall hole and the rainwater conveying pipe to realize the detachable connection between the rainfall hole and the rainwater conveying pipe.

The second aspect of the example of the present invention provides a test method using the pile-supported embankment model test device under the action of rainfall and dry-wet cycle, including the following steps:

s1. the pile body is evenly arranged in the bottom plate of the model box, and the pile strain gauge is evenly arranged on both sides of the pile body;

s2. based on the bottom plate of model box bottom plate, the model box unit is stacked layer by layer, each time a layer of model box unit is filled, the foundation soft soil or subgrade soil is filled in the enclosed space, and a TDR probe sensor, an earth pressure box, a pore water pressure sensor, and a settlement plate are arranged;

s3. after the subgrade soil, foundation soft soil, and various sensors are arranged, water is injected from the drainage system set at the bottom of the side of the unit model box system to simulate the groundwater level of the foundation soft soil in the model box;

s4. after the groundwater is injected and stood for a period of time, the inlet valve of the rainfall control device is opened and the rainfall intensity is controlled according to the pressure gauge, and then the rainfall control valve is opened to realize the simultaneous drainage of each rainfall hole to simulate the rainfall process;

s5. after the simulation of the rainfall process, and after a period of time, when the rainwater infiltrates into the foundation soil and reaches the water level condition of the test, the data of the test process are collected and recorded by various sensors embedded in the soil;

s6. opening the drainage system of the model box system, discharging the water in the soil, and adjusting the height of the telescopic rod, using the voltage control device to provide voltage for the resistance wire to dry the soil, and using the dehumidifier to adjust the humidity in the model box system;

s7. after the humidity in the soil reaches the requirements set by the test, various sensors embedded in the soil are used to collect and record the data of the test process, and the data recorded before and after drainage are compared and analyzed; and s8. after the completion of the test, the subgrade soil, foundation soft soil, and various sensors are removed layer by layer from top to bottom, and the unit model box system is disassembled.

Preferably, the arrangement of the TDR probe sensor, the earth pressure box, the pore water pressure sensor, and the settlement plate described in step s2 is as follows: the earth pressure box and settlement plate are evenly buried every 5 cm in the subgrade soil above the pile cap and the soil between piles; the pore water pressure sensor is uniformly buried every 10 cm along the subgrade soil height; three rows of TDR probe sensors are buried along the slope direction of the embankment slope; displacement sensors are uniformly embedded at the top of the surface layer and the top of the embankment filling every 10 cm; the earth pressure box, the pore water pressure sensor and the settlement plate are buried every 10 cm in the soil between piles, connecting each measuring element with the data acquisition instrument and reading the data collected by each measuring element.

Preferably, the control of rainfall intensity according to the pressure gauge described in step s4 is as follows: adjusting the inlet valve according to the pressure gauge to adjust the water pressure, and adjusting the size of the rainfall hole according to the required rainfall intensity and rainfall rate.

Preferably, in step s6, the height of the telescopic pole and the voltage applied to the resistance wire need to be tested before the soil is dried.

Compared with the existing technology, the beneficial effects of the present invention are:

1. the present invention uses a rainfall control device and a drying system, compared with the traditional pile-supported reinforced embankment model test device, the present invention can simulate the rainfall and drying process, and can be used to study the working characteristics of the pile-supported embankment under rainfall and dry-wet cycles, it can also be applied to the model test of end-bearing piles and suspended piles, and its practicability is more extensive.

2. Compared with the traditional device, the unit model box system adopted in this invention has adjustable height, which can meet the needs of simulating soft soil, pile foundation and embankment at different heights; meanwhile, the use of steel plates with different heights to form a model box can facilitate the filling of soil, which is conducive to the realization of the compactness of foundation soil or subgrade soil and the verticality of pile foundation.

3. The present invention adopts a drying system combining voltage control and resistance wire height control, compared with the traditional temperature regulating system, the temperature regulating range of the device is wider and more flexible, which can make up for the defects of partial sensor damage caused by the high temperature of the resistance wire.

4. The rainfall control device of the present invention adopts a sleeve structure, and uses a rainfall control pipe and a rainfall control valve, compared with the existing simulated rainfall device, it can realize the simultaneous water supply of the rainwater conveying pipe and simulate the rainfall, it avoids the short time difference on the same rainfall section caused by the different order of water flow in the inlet pipe into the rainwater conveying pipe, and ensures the rainfall synchronization on the same rainfall section, thereby improving the uniformity of rainwater distribution.

5. The rainfall control device of the present invention adopts a detachable rainfall hole, and the size of the rainfall hole can be changed to adjust the raindrop diameter and the falling rate according to the needs of different experiments.

6. The model box unit block vertical reinforcement system and the model box unit block horizontal reinforcement system adopted in the present invention can perform vertical and horizontal reinforcement on the unit model box system, so as to avoid excessive gaps at the splicing of the model box unit body, and can avoid the deformation of the model box caused by the lateral pressure and water pressure of the soil during the test, and reduce the test error.

7. The drainage system at the bottom of the model box can facilitate the discharge of water in the soil and improve the efficiency of the drying process, meanwhile, the drainage system located on the upper part of the model box can limit the maximum water level in the soil to be more accurate and convenient.

8. The unit model box system, the rainfall control device and the drying system adopted in the present invention can be disassembled flexibly, which is convenient for the transportation and preservation of the device.

Figure 1:
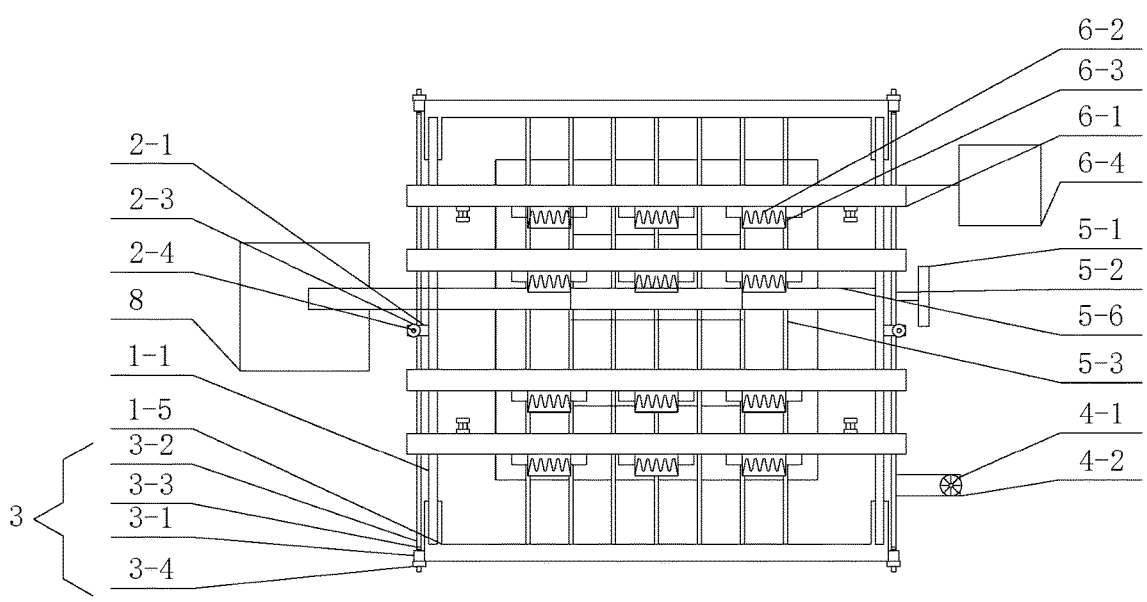
FIG. 1 is a top view of a pile-supported embankment model test device under an action of rainfall and dry-wet cycle.

In the figures, the unit model box system 1, the unit body of the model box 1-1, unit body tenon 1-2, the water swelling rubber 1-3, the unit body tenon groove 1-4, and the bottom plate of the model box 1-5;

vertical reinforcement system of the model box unit block 2, the first welded steel 2-1, the first thread 2-2, the first nut 2-3, first pair of pull steel bar 2-4;

transverse reinforcement system of the model box unit block 3, the second welded steel 3-1, the second pair of pull steel bar 3-2, the second thread 3-3, the second nut 3-4;

drainage system 4, drainage valve 4-1, drainage pipe 4-2, geotextile 4-3;

rainfall control device 5, rainfall control valve 5-1, rainfall control pipe 5-2, rainwater conveying pipe 5-3, pressure gauge 5-4, inlet valve 5-5, inlet pipe 5-6, inlet channel 5-7, rainwater conveying channel 5-8, installation thread 5-9, rainfall hole 5-10;

drying system 6, fixed beam 6-1, resistance wire 6-2, safety box 6-3, voltage control device 6-4, telescopic pole 6-5, connecting bolt 6-6, connecting hole 6-7, fixed pole 6-8, third thread 6-9;

mobile system 7, roller baffle 7-1, fixed hole 7-2, roller 7-3;

dehumidifier 8;

sensor system 9, TDR probe sensor 9-1, earth pressure box 9-2, pore water pressure sensor 9-3, settlement plate 9-4, pile strain gauge 9-5;

pile-soil system 10, pile cap 10-1, subgrade soil 10-2, foundation soft soil 10-3;

water tank 11.

DETAILED DESCRIPTION OF THE EMBODIMENTS

Illustrative embodiments are described in detail here, and the examples are shown in the accompanying diagram. The following description relates to drawings, unless otherwise indicated, where the same number in different drawings represents the same or similar elements. The embodiment described in the following exemplary embodiments does not represent all embodiments consistent with the present invention. On the contrary, they are only examples of devices and methods that are consistent with some aspects of the invention as detailed in the accompanying claims.

The terms used in the present invention are used solely for the purpose of describing a particular embodiment, and are not intended to limit the present invention. The singular forms of 'one,' 'stated' and 'that' used in the present invention and the accompanying claims are also intended to include the majority form, unless the context clearly indicates other meanings. It should also be understood that the terms 'and/or' used in this article refer to and include any or all possible combinations of one or more associated listed items.

It should be understood that although the terms first, second, third, etc. may be used in this invention to describe various information, this information should not be limited to these terms. These terms are only used to distinguish the same type of information from each other. For example, without deviating from the scope of the invention, the first information may also be called the second information, similarly, the second information may also be called the first information. Depending on the context, such as the word 'if' used here may be interpreted as 'as . . . ' or 'when . . . ' or 'in response to certainty'.

The following is a detailed description of the invention in combination with the attached figure. In the absence of conflict, the following implementation examples and the characteristics of the implementation methods may be combined with each other.

Refer to FIGS. 1-12, the embodiment of the present invention provides a pile-supported embankment model test device under an action of rainfall and dry-wet cycle, wherein the test device includes an unit model box system 1, a vertical reinforcement system 2 of the model box unit block, a transverse reinforcement system 3 of the model box unit block, a rainfall control device 5 and a drying system 6.

In this embodiment, the unit model box system 1 includes an unit body of the model box 1-1, an unit body tenon 1-2, an unit body tenon groove 1-4, and a bottom plate of the model box 1-5. Wherein, the unit body of the model box 1-1 is located on a side of bottom plate of the model box 1-5, and is spliced up layer by layer to form the unit model box system 1; a water swelling rubber 1-3 is set in the unit body tenon groove 1-4, which may effectively avoid the leakage of water from the splicing gap in the model box; the unit body tenon groove 1-4 is located below the unit body tenon 1-2, and the the unit body tenon 1-2 and the unit body tenon groove 1-4 are tenoned, as shown in FIGS. 1-6.

It should be understood that, based on the bottom plate of the model box 1-5, the unit body of the model box 1-1, the unit body tenon 1-2, the water swelling rubber 1-3, and the unit body tenon groove 1-4 are spliced layer by layer to form the unit model box system 1.

Further, a side of the the unit model box system 1 is equipped with drainage systems 4.

Further, the number of drainage systems 4 is greater than or equal to 2, and one drainage system of the drainage systems is located at the bottom of the side of the unit model box system 1 for input and discharge of water; and the remaining drainage systems 4 are located at different heights on the side of the unit model box system 1, which is used to control the water level height in the model box.

Figure 2:
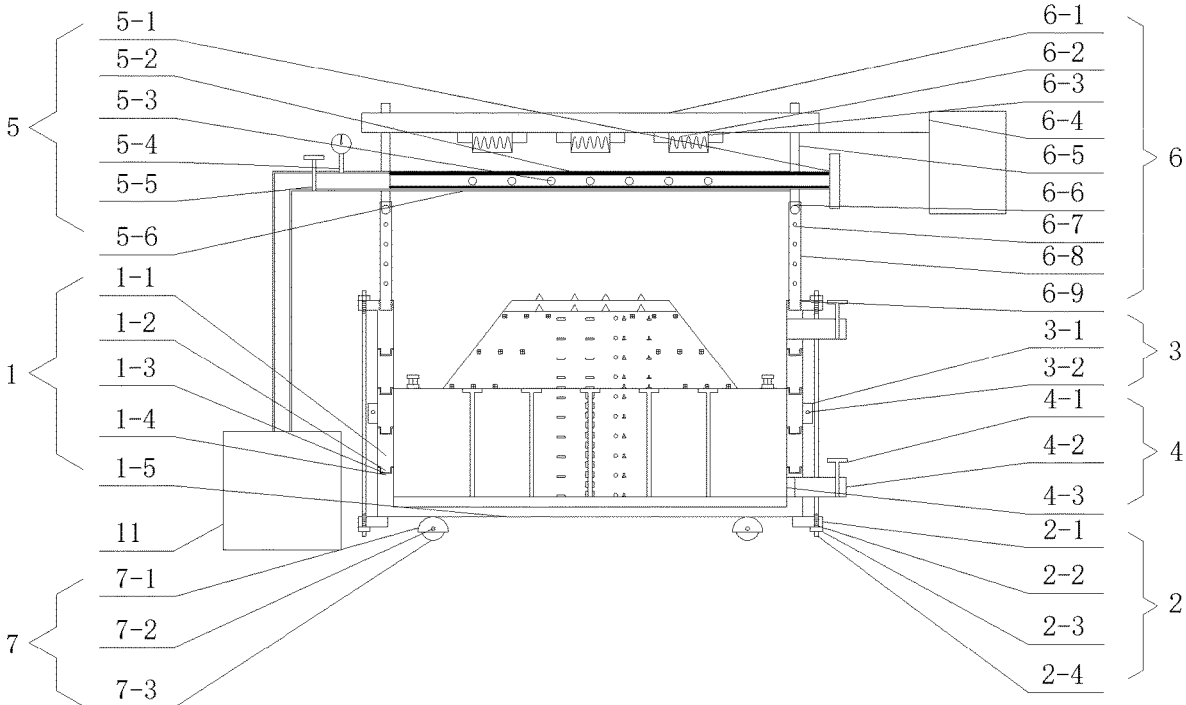
FIG. 2 is a sectional view of a pile-supported embankment model test device under an action of rainfall and dry-wet cycle.
Figures 3, 4, 5, 6:
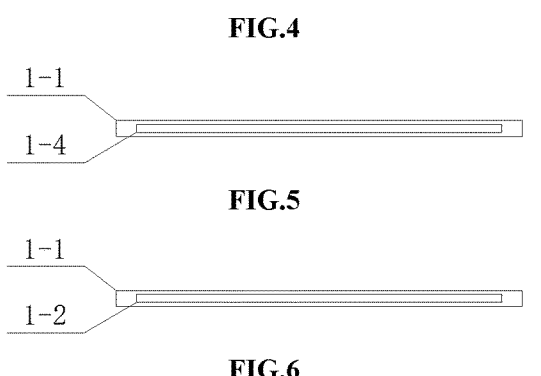
FIG. 3 is a side view of a pile-supported embankment model test device under an action of rainfall and dry-wet cycle.
FIG. 4 is a front view of details of an unit body of the model box.
FIG. 5 is a vertical view of details of an unit body of the model box.
FIG. 6 is an upward view of details of an unit body of the model box.
Figure 7:
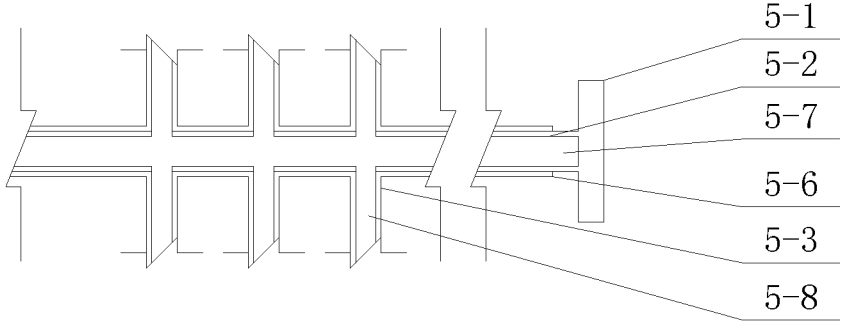
FIG. 7 is a detailed picture of the opening state of a rainfall control device.
Figure 8:
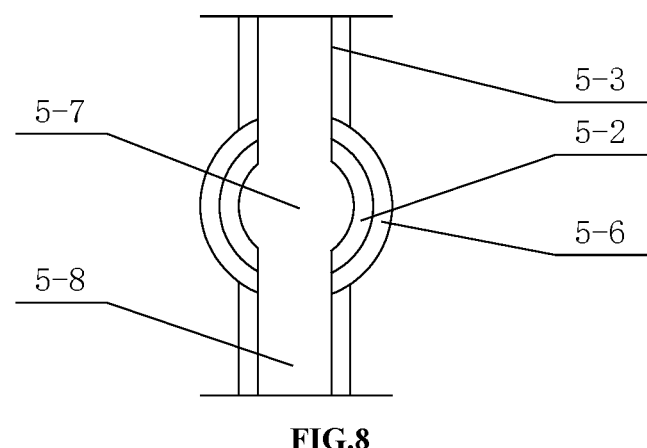
FIG. 8 is a side view of the details of the opening state of a rainfall control device.
Figure 9:
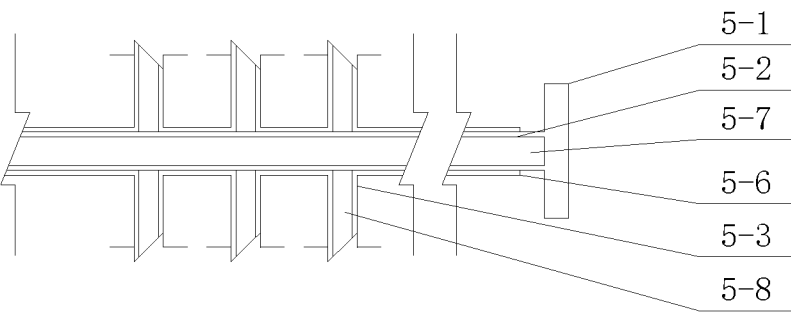
FIG. 9 is a detailed picture of the closing state of a rainfall control device.
Figure 10:
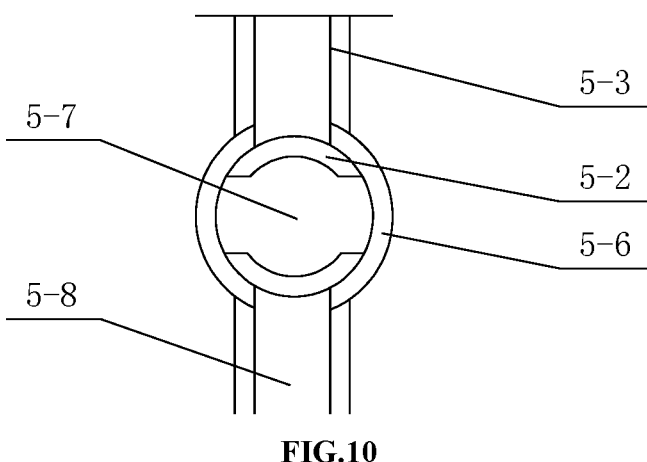
FIG. 10 is a detailed picture of the closing state of a rainfall control device.

Refer to FIGS. 1-3, the drainage system 4 includes a drainage valve 4-1, a drainage pipe 4-2, and a geotextile 4-3, wherein the drainage valve 4-1 is installed on the drainage pipe 4-2, which may control the input water and the discharge water.

Refer to FIGS. 2-3, the bottom of the bottom plate of the model box 1-5 is provided with a moving system 7, the moving system 7 includes a roller baffle 7-1, a fixed hole 7-2, and a roller 7-3. Wherein the roller 7-3 is installed on the roller baffle 7-1, and the fixed hole 7-2 is located in the center of the roller baffle 7-1. When the unit model box system 1 moves to the specified position, the pin fixed may be inserted into the fixed hole 7-2, so that the roller baffle 7-1 and the roller 7-3 fixed connection, thus, it may effectively avoid the movement of the unit model box system 1 during use.

In this example, the vertical reinforcement system 2 of the model box unit block includes a first welded steel 2-1 and a first pair of pull steel bars 2-4. Wherein, the first welded steel 2-1 are welded on the top and bottom of the two sides of the unit model box system 1 respectively, and the first welded steel 2-1 is provided with a first hole; the first pair of pull steel bars 2-4 passes through the first hole set by the first welded steel 2-1, the two ends of the first pair of pull steel bars 2-4 are provided with a first thread 2-2; a first nut 2-3 is installed on the first thread 2-2, as shown in FIGS. 2-3. Through the first thread 2-2 and the first nut 2-3, the unit model box system 1 may be vertically reinforced, which further avoids the large gap at the splicing of the unit body of the model box 1-1.

Refer to FIGS. 1-3, the transverse reinforcement system 3 of the model box unit block includes a second welded steel 3-1 and a second pair of pull steel bars 3-2. Wherein, the second welded steel 3-1 is welded on the left and right sides of the two sides of the unit model box system 1, the second welded steel 3-1 is provided with a second hole; the second pair of pull steel bars 3-2 passes through the second hole set by the second welded steel 3-1, the two ends of the second pair of pull steel bars 3-2 are provided with a second thread 3-3; a second nut 3-4 is installed on the second thread 3-3. Through the second thread 3-3 and the second nut 3-4, the unit model box system 1 may be transversely reinforced.

In this example, the rainfall control device 5 includes a rainfall control pipe 5-2, a rainwater conveying pipe 5-3, a pressure gauge 5-4, a inlet valve 5-5, and a inlet pipe 5-6. Wherein the inlet pipe 5-6 is connected with the water tank 11; the inlet valve 5-5 and the pressure gauge 5-4 are installed on the inlet pipe 5-6, the water pressure may be controlled by the inlet valve 5-5 and the pressure gauge 5-4, and the simulation of rainfall intensity may be realized; the rainfall control pipe 5-2 is arranged in the inlet pipe 5-6, the side of the rainfall control pipe 5-2 is connected with the rainfall control valve 5-1, the rainfall control valve 5-1 may control the rotation of the rainfall control pipe 5-2, and then control the opening and closing of the simulated rainfall, as shown in FIG. 1 and FIG. 2.

Refer to FIGS. 7-10, an inlet channel 5-7 is arranged inside the inlet pipe 5-6, a rainwater conveying channel 5-8 is arranged inside the rainwater conveying pipe 5-3, when the rainfall control valve 5-1 is opened, the inlet channel 5-7 is connected with the rainwater conveying channel 5-8; when the rainfall control valve 5-1 is closed, the inlet channel 5-7 is disconnected from the rainwater conveying channel 5-8.

The rainfall control valve 5-1 is used to control the start and end of the simulated rainfall process. Specifically, when the rainfall control valve 5-1 opens, the inlet channel 5-7 in the inlet pipe 5-6 is connected with the rainwater conveying channel 5-8 in the rainwater conveying pipe 5-3, the two are connected to realize the opening of the simulated rainfall process; when the rainfall control valve 5-1 is closed, the inlet channel 5-7 in the inlet pipe 5-6 is disconnected from the rainwater conveying channel 5-8 in the rainwater conveying pipe 5-3 to achieve the end of the simulated rainfall process.

Figure 11:
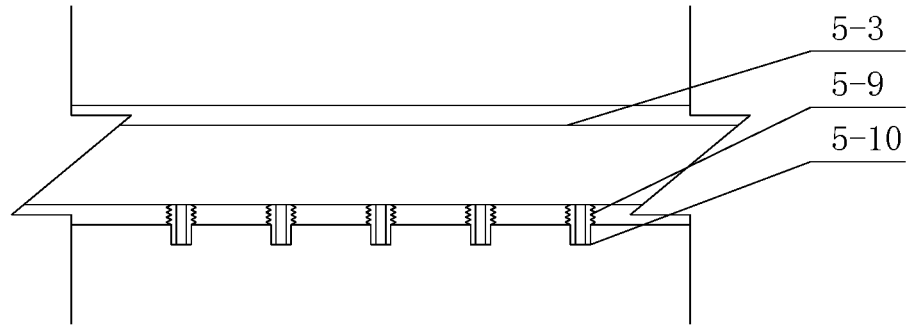
FIG. 11 is a detailed diagram of a rainwater conveying pipe.
Figure 12:
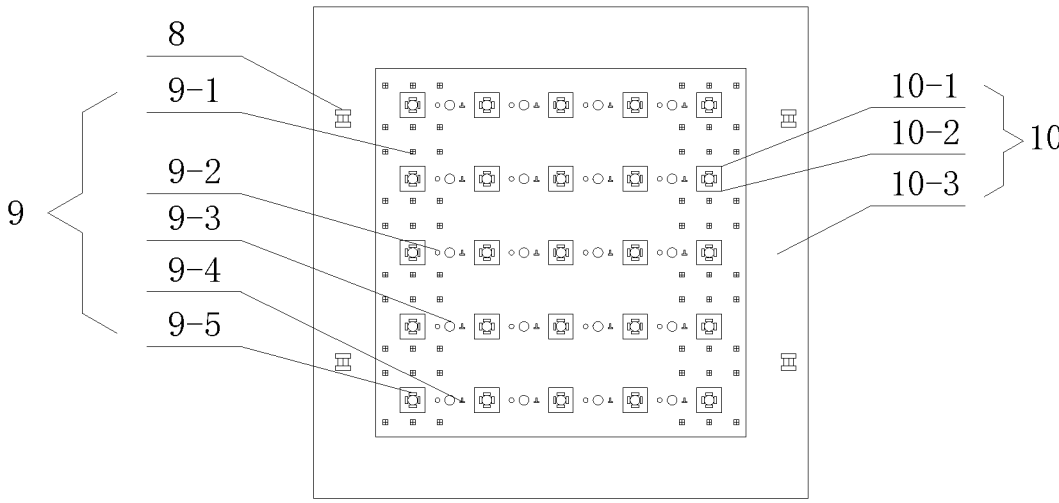
FIG. 12 is a schematic diagram of an instrument layout plane (at the surface of the soft soil foundation).

Further, rainfall holes 5-10 are uniformly arranged at the bottom of the rainwater conveying pipe 5-3, as shown in FIG. 11. The connection between the rainfall hole 5-10 and the rainwater conveying pipe 5-3 is provided with an installation thread 5-9 to realize the detachable connection between the rainfall hole 5-10 and the rainwater conveying pipe 5-3. In addition, the hole size of the rainfall hole 5-10 may be changed according to different test requirements, and then the diameter of the raindrop and the rainfall velocity may be changed.

It should be understood that due to the detachable connection between the rainfall holes 5-10 and the rainwater pipe 5-3, the rainfall holes 5-10 of different sizes may be replaced according to the test requirements, thereby changing the diameter of the raindrop and the rainfall speed.

In this embodiment, the drying system 6 includes a fixed beam 6-1, a resistance wire 6-2, a safety box 6-3, a voltage control device 6-4, a telescopic pole 6-5, and a fixed pole 6-8. Wherein, the bottom of the fixed pole 6-8 is provided with a third thread 6-9, the fixed pole 6-8 is connected with the unit model box system 1 through the third thread 6-9; connecting holes 6-7 are evenly arranged from top to bottom on the fixed pole 6-8; the bottom of the telescopic pole 6-5 is provided with a third hole, after the third hole is aligned with the connecting hole 6-7 set on the fixed pole 6-8, the telescopic pole 6-5 is connected to the fixed pole 6-8 by the connecting bolt 6-6, the top of the telescopic pole 6-5 is detachably connected with the fixed beam 6-1, in addition, the height of the telescopic rod 6-5 may be adjusted according to the actual needs; the resistance wire 6-2 is evenly arranged at the bottom of the fixed beam 6-1, the resistance wire 6-2 is externally installed with a safety box 6-3, the resistance wire 6-2 is protected by the safety box 6-3, it may effectively avoid the resistance wire 6-2 in water or dust damage, meanwhile, it avoids the safety hazard caused by improper touch of the resistance wire 6-2 by the operator in the operation project; the resistance wire 6-2 is connected to the voltage control device 6-4, and the temperature of the resistance wire 6-2 may be changed by controlling the voltage, as shown in FIGS. 1-3.

It should be understood that connecting holes 6-7 are arranged on the fixed pole 6-8, the third hole set at the bottom of the telescopic pole 6-5 may be aligned with the corresponding connecting hole 6-7 according to the actual needs, and the telescopic pole 6-5 may be connected to the fixed pole 6-8 through the connecting bolt 6-6.

The test device in the embodiment of the present invention includes an unit model box system 1, a vertical reinforcement system 2 of the model box unit block, a transverse reinforcement system 3 of the model box unit block, a rainfall control device 5 and a drying system 6. Wherein, The height of the model box in the unit model box system 1 is adjustable to meet the needs of simulating soft soil, pile foundation and embankment at different heights, and it is convenient for soil filling, which is helpful to realize the compaction degree of foundation soil or subgrade soil and the verticality of pile foundation; the vertical reinforcement system 2 of the model box unit block and the transverse reinforcement system 3 of the model box unit block may reinforce the unit model box system 1 vertically and horizontally, in order to avoid the unit body of the model box 1-1 splicing appear too large gap, it may also avoid the deformation of the model box caused by the lateral pressure and water pressure of the soil during the test; through the rainfall control pipe 5-2 and the rainfall control valve 5-1 of the rainfall control device 5, the rainwater conveying pipe 5-3 may be simultaneously watered to simulate rainfall, it ensures the synchronization of rainfall on the same rainfall section and improves the uniformity of rainwater distribution; the detachable rainfall hole 5-10 may be used to change the size of the rainfall hole 5-10 to adjust the raindrop diameter and the falling rate according to the needs of different tests; the drying system 6 combined with voltage control and resistance wire 6-2 height control makes the temperature adjustment range wider and more flexible, and makes up for the defect that some sensors are damaged due to the high temperature of resistance wire 6-2. The present invention adopts the rainfall control device 5 and the drying system 6, compared with the traditional pile-supported reinforced embankment model test device, it may simulate the natural environment rainfall and drying process, and realize the research on the working characteristics of pile-supported embankment under rainfall and dry-wet cycle, and the present invention may be applied to the model test of end bearing pile and suspended pile at the same time, and its practicability is more extensive, compared with the method of engineering measurement, the present invention has the advantages of simple operation, low cost, short period and small environmental impact.

It is worth mentioning that the embodiment of the present invention also provides a test method using the pile-supported embankment model test device under the action of the above-mentioned rainfall and dry-wet cycle, as shown in FIGS. 1-12, including the following steps:

S1. the pile body is evenly arranged in the bottom plate of the model box 1-5, and the strain gauges of the pile body are evenly arranged on both sides of the pile body.

In this example, the piles may be evenly arranged according to the test scheme. For example, the center distance between two adjacent piles is 0.2 m, or 0.3 m, which may be determined according to the actual needs.

It should be understood that the strain gauges of the pile body are evenly arranged along both sides of the pile body. For example, the strain gauges of the pile body may be arranged every 5 cm. The specific test plan may be determined and evenly arranged on both sides of the pile body.

S2. Based on the model box bottom plate 1-5, the unit body of the model box 1-1 is stacked layer by layer, when layer of unit body of the model box 1-1 is filled in the enclosed space to fill the foundation soft soil 10-3 or subgrade soil 10-2, and a TDR probe sensor 9-1, an earth pressure box 9-2, a pore water pressure sensor 9-3, and a settlement plate 9-4 are arranged.

Specifically, the earth pressure cell 9-2 and the settlement plate 9-4 are uniformly buried every 5 cm in the pile cap 10-1 and the subgrade soil 10-2 above the pile soil; the pore water pressure sensor 9-3 is uniformly buried every 10 cm along the subgrade soil 10-2 height; three rows of the TDR probe sensors 9-1 are buried along the slope direction of the embankment slope; a displacement sensor is uniformly buried at the top of the surface layer and the top of the embankment filling every 10 cm; the earth pressure box 9-2, the pore water pressure sensor 9-3, and the settlement plate 9-4 are buried every 10 cm in the soil between piles, and each measuring element is connected with the data acquisition instrument and the data collected by each measuring element is read.

S3. After the arrangement of the subgrade soil 10-2, the foundation soft soil 10-3 and various sensors is completed, water is injected from the drainage system 4 set at the bottom of the side of the unit model box system 1 to simulate the groundwater level of foundation soft soil 10-3 in the model box.

S4. After the groundwater is injected and left standing for a period of time, the inlet valve 5-5 of the rainfall control device 5 is opened first and the rainfall intensity is controlled according to the pressure gauge 5-4, and then the rainfall control valve 5-1 is opened to realize the simultaneous drainage of 5-10 rainfall holes to realize the simulation of the rainfall process.

Specifically, according to the pressure gauge 5-4, the inlet valve 5-5 is adjusted to change the water pressure, by using different sizes of rainfall holes 5-10, the simulation of different rainfall intensity and rainfall rate is realized.

S5. After the simulation of the rainfall process is completed, and after a period of time, when the rainwater infiltrates into the foundation soil and reaches the water level set by the test, the data of the test process are collected and recorded by various sensors embedded in the soil.

S6. Opening the drainage system 4 of the model box system 1, discharging the water in the soil, and adjusting the height of the telescopic rod 6-5, using the voltage control device 6-4 to provide voltage for the resistance wire 6-2 to dry the soil, and using the dehumidifier 8 to adjust the humidity in the model box system 1.

In this implementation, before drying the soil, it is necessary to test the height of the telescopic pole 6-5 and the voltage applied to the resistance wire 6-2, and then obtain the temperature transmitted to the subgrade soil by the resistance wire 6-2 at different heights of the telescopic pole 6-5 and different voltages, so as to avoid the damage of each instrument due to the high surface temperature of the soil or the low surface temperature of the soil, resulting in low drying efficiency or even failure to achieve the expected drying effect.

It should be understood that before drying the soil, the height of the telescopic pole 6-5 and the voltage applied to the resistance wire 6-2 are tested, after drying, the height of the telescopic pole 6-5 and the voltage applied to the resistance wire 6-2 are also tested, according to the height of the telescopic pole 6-5 and the voltage applied to the resistance wire 6-2 before and after drying, the temperature of the resistance wire 6-2 transmitted to the subgrade soil under different height of the telescopic pole 6-5 and different voltage may be analyzed.

S7. After the humidity in the soil meets the requirements of the test setting, the data of the test process are collected and recorded by various sensors embedded in the soil, and the data recorded before and after drainage are compared and analyzed.

It should be understood that by comparing the test results before and after drainage, the influence of rainfall on the stress and deformation of pile-supported embankment may be analyzed.

S8. After the test is completed, the subgrade soil 10-2, the foundation soft soil 10-3 and various sensors are removed layer by layer from top to bottom, and the unit model box system 1 is disassembled.

It should be noted that the above test process may be repeated several times according to the test scheme. Through the analysis of the test results, the influence of dry-wet cycle on the stress and deformation of pile-supported embankment may be studied.

The above is only the preferred implementation method of the present invention. Although the invention has been disclosed as a better implementation example, it is not used to limit the invention. Any technical personnel familiar with this field, without deviating from the scope of the technical scheme of the invention, may use the method and technical content revealed above to make many possible changes and modifications to the technical scheme of the invention, or modify it into an equivalent embodiment of the equivalent change. Therefore, any simple modification, equivalent change and modification made to the above embodiment according to the technical essence of the invention, which is not separated from the content of the technical scheme of the invention, still belongs to the scope of the protection of the technical scheme of the present invention.

What is claimed is:

1. A pile-supported embankment model test device under an action of rainfall and dry-wet cycle, comprising:

an unit model box system comprises an unit body of model box, an unit body tenon, an unit body tenon groove, and a bottom plate of model box; wherein the unit body of model box is located on side edges of the bottom plate of model box, and is spliced up layer by layer to form the unit model box system; water swelling rubber is set in the unit body tenon groove; the unit body tenon groove is located below the unit body tenon, and the unit body tenon and the unit body tenon groove are tenoned;

a vertical reinforcement system of model box unit block comprises a first welded steel and a first pair of pull steel bars; the first welded steel is welded at top and bottom of two sides of a plate of the unit model box system respectively, and the first welded steel is provided with a first hole; the first pair of pull steel bars passes through the first hole; a first thread is set at both ends of the first pair of pull steel bars; a first nut is installed on the first thread;

a transverse reinforcement system of model box unit block comprises a second welded steel and a second pair of pull steel bars; the second welded steel is welded on left and right sides of plates on both sides of the unit model box system; the second welded steel is provided with a second hole; the second pair of pull steel bars passes through the second hole, a second thread is set at both ends of the second pair of pull steel bars, a second nut is installed on the second thread;

a rainfall control device, comprising a rainfall control pipe, a rainwater conveying pipe, a pressure gauge, an inlet valve, and an inlet pipe; the inlet pipe is connected to a water tank; the pressure gauge and the inlet valve are installed on the inlet pipe; the rainfall control pipe is set in the inlet pipe, a side of the rainfall control pipe is connected with the rainfall control valve; and a drying system, comprising a fixed beam, a resistance wire, a safety box, a voltage control device, a telescopic pole, and a fixed pole; a third thread is set in a bottom of the fixed pole, the fixed pole is connected with the unit model box system through the third thread, the fixed pole is evenly set with connecting holes from top to bottom; a third hole is arranged on a bottom of the telescopic pole, after the third hole is aligned with the connecting holes, it is connected by connecting bolts; a top of the telescopic pole is detachably connected with the fixed beam; the resistance wire is evenly arranged at a bottom of the fixed beam, the safety box is installed outside the resistance wire, and the resistance wire is connected with the voltage control device.

2. The pile-supported embankment model test device under the action of rainfall and dry-wet cycle according to claim 1, wherein a side of the unit model box system is provided with drainage systems, wherein each of the drainage systems comprises a drainage valve, a drainage pipe, and a geotextile; and the drainage valve is installed on the drainage pipe.

3. The pile-supported embankment model test device under the action of rainfall and dry-wet cycle according to claim 2, wherein a number of the drainage systems is greater than or equal to 2, and one drainage system of the drainage systems is located at a bottom of a side of the unit model box system, and remaining drainage systems are located at different heights on the side of the unit model box system.

4. The pile-supported embankment model test device under the action of rainfall and dry-wet cycle according to claim 1, wherein a moving system is arranged at a bottom of the model box bottom plate, the moving system comprises a roller baffle, a fixed hole, and a roller; the roller is installed on the roller baffle, and the fixed hole is located in a center of the roller baffle.

5. The pile-supported embankment model test device under the action of rainfall and dry-wet cycle according to claim 1, wherein an inlet channel is set inside the inlet pipe, a rainwater conveying channel is set inside the rainwater conveying pipe, when the rainfall control valve is opened, the water inlet channel is connected with the rainwater conveying channel; when the rainfall control valve is closed, the water inlet channel is disconnected from the rainwater conveying channel.

6. The pile-supported embankment model test device under the action of rainfall and dry-wet cycle according to claim 5, wherein rainfall holes are uniformly arranged at a bottom of the rainwater conveying pipe; an installation thread is arranged at a connection between each of the rainfall holes and the rainwater conveying pipe to realize a detachable connection between each of the rainfall holes and the rainwater conveying pipe.

7. A test method using the pile-supported embankment model test device under the action of rainfall and dry-wet cycle according to claim 1, comprising following steps:

s1. a pile body is evenly arranged in the bottom plate of model box, and a pile strain gauge is evenly arranged on both sides of the pile body;

s2. based on the bottom plate of model box, the unit body of model box is installed, foundation soft soil or subgrade soil is filled in an enclosed space, and a TDR probe sensor, an earth pressure box, and a pore water pressure sensor are arranged;

s3. after the subgrade soil, the foundation soft soil, and various sensors are arranged, water is injected from a drainage system set at a bottom of a side of the unit model box system to simulate a groundwater level of the foundation soft soil in a model box;

s4. after groundwater is injected and stood for a period of time, the inlet valve of the rainfall control device is opened and a rainfall intensity is controlled according to the pressure gauge, and then the rainfall control valve is opened to realize a simultaneous drainage of each rainfall hole to simulate a rainfall process;

s5. after a simulation of the rainfall process and a period of time, when rainwater infiltrates into the foundation soft soil and reaches a water level condition of a test, data of a test process are collected and recorded by various sensors embedded in the foundation soft soil;

s6. opening a drainage system of the unit model box system, discharging water in the foundation soft soil, and adjusting a height of the telescopic pole, using the voltage control device to provide voltage for the resistance wire to dry the foundation soft soil, and using a dehumidifier to adjust humidity in the unit model box system; and s7. after the humidity in the foundation soft soil reaches requirements set by the test, various sensors embedded in the foundation soft soil are used to collect and record the data of the test process, and data recorded before and after drainage are compared and analyzed.

8. The test method according to claim 7, wherein arrangement of the TDR probe sensor, the earth pressure box, and the pore water pressure sensor described in step s2 is as follows: the earth pressure box is evenly buried every 5 cm in the subgrade soil above a pile cap and soil between pile bodies; the pore water pressure sensor is uniformly buried every 10 cm along a height of the subgrade soil; three rows of TDR probe sensors are buried along a slope direction of an embankment slope; displacement sensors are uniformly embedded at a top of a surface layer and a top of an embankment filling every 10 cm; the earth pressure box and the pore water pressure sensor are buried every 10 cm in the soil between pile bodies, connecting each measuring element with a data acquisition instrument and reading data collected by each measuring element.

9. The test method according to claim 7, wherein control of rainfall intensity according to the pressure gauge described in step s4 is as follows: adjusting the inlet valve according to the pressure gauge to adjust a water pressure, and adjusting a size of a rainfall hole according to required rainfall intensity and rainfall rate.

10. The test method according to claim 7, wherein in step s6, the height of the telescopic pole and the voltage applied to the resistance wire need to be tested before the foundation soft soil is dried.

11. A test method using the pile-supported embankment model test device under the action of rainfall and dry-wet cycle according to claim 2, comprising following steps:

s1. a plurality of pile bodies are evenly arranged in the bottom plate of model box, and a pile strain gauge is evenly arranged on both sides of each pile body;

s2. based on the bottom plate of model box, the unit body of model box is installed, foundation soft soil or subgrade soil is filled in an enclosed space, and a TDR probe sensor, an earth pressure box, and a pore water pressure sensor are arranged;

s3. after the subgrade soil, the foundation soft soil, and various sensors are arranged, water is injected from the drainage systems set at a bottom of the side of the unit model box system to simulate a groundwater level of the foundation soft soil in a model box;

s4. after groundwater is injected and stood for a period of time, the inlet valve of the rainfall control device is opened and a rainfall intensity is controlled according to the pressure gauge, and then the rainfall control valve is opened to realize a simultaneous drainage of each rainfall hole to simulate a rainfall process;

s5. after a simulation of the rainfall process and a period of time, when rainwater infiltrates into the foundation soft soil and reaches a water level condition of a test, data of a test process are collected and recorded by various sensors embedded in the foundation soft soil;

s6. opening a drainage system of the unit model box system, discharging water in the foundation soft soil, and adjusting a height of the telescopic pole, using the voltage control device to provide voltage for the resistance wire to dry the foundation soft soil, and using a dehumidifier to adjust humidity in the unit model box system; and s7. after the humidity in the foundation soft soil reaches requirements set by the test, various sensors embedded in the foundation soft soil are used to collect and record the data of the test process, and data recorded before and after drainage are compared and analyzed; and s8. after the completion of the test, the subgrade soil, foundation soft soil, and various sensors are removed layer by layer from top to bottom, and the unit model box system is disassembled.

12. A test method using the pile-supported embankment model test device under the action of rainfall and dry-wet cycle according to claim 3, comprising following steps:

s1. a plurality of pile bodies are evenly arranged in the bottom plate of model box, and a pile strain gauge is evenly arranged on both sides of each pile body;

s2. based on the bottom plate of model box, the unit body of model box is installed, foundation soft soil or subgrade soil is filled in an enclosed space, and a TDR probe sensor, an earth pressure box, and a pore water pressure sensor are arranged;

s3. after the subgrade soil, the foundation soft soil, and various sensors are arranged, water is injected from drainage systems set at a bottom of the side of the unit model box system to simulate a groundwater level of the foundation soft soil in a model box;

s4. after groundwater is injected and stood for a period of time, the inlet valve of the rainfall control device is opened and a rainfall intensity is controlled according to the pressure gauge, and then the rainfall control valve is opened to realize a simultaneous drainage of each rainfall hole to simulate a rainfall process;

s5. after a simulation of the rainfall process and a period of time, when rainwater infiltrates into the foundation soft soil and reaches a water level condition of a test, data of a test process are collected and recorded by various sensors embedded in the foundation soft soil;

s6. opening a drainage system of the unit model box system, discharging water in the foundation soft soil, and adjusting a height of the telescopic pole, using the voltage control device to provide voltage for the resistance wire to dry the foundation soft soil, and using a dehumidifier to adjust humidity in the unit model box system; and s7. after the humidity in the foundation soft soil reaches requirements set by the test, various sensors embedded in the foundation soft soil are used to collect and record the data of the test process, and data recorded before and after drainage are compared and analyzed; and s8. after the completion of the test, the subgrade soil, foundation soft soil, and various sensors are removed layer by layer from top to bottom, and the unit model box system is disassembled.

13. A test method using the pile-supported embankment model test device under the action of rainfall and dry-wet cycle according to claim 4, comprising following steps:

s1. a plurality of pile bodies are evenly arranged in the bottom plate of model box, and a pile strain gauge is evenly arranged on both sides of each pile body;

s2. based on the bottom plate of model box, the unit body of model box is installed, foundation soft soil or subgrade soil is filled in an enclosed space, and a TDR probe sensor, an earth pressure box, and a pore water pressure sensor are arranged;

s3. after the subgrade soil, the foundation soft soil, and various sensors are arranged, water is injected from a drainage system set at a bottom of a side of the unit model box system to simulate a groundwater level of the foundation soft soil in a model box;

s4. after groundwater is injected and stood for a period of time, the inlet valve of the rainfall control device is opened and a rainfall intensity is controlled according to the pressure gauge, and then the rainfall control valve is opened to realize a simultaneous drainage of each rainfall hole to simulate a rainfall process;

s5. after a simulation of the rainfall process and a period of time, when rainwater infiltrates into the foundation soft soil and reaches a water level condition of a test, data of a test process are collected and recorded by various sensors embedded in the foundation soft soil;

s6. opening a drainage system of the unit model box system, discharging water in the foundation soft soil, and adjusting a height of the telescopic pole, using the voltage control device to provide voltage for the resistance wire to dry the foundation soft soil, and using a dehumidifier to adjust humidity in the unit model box system; and s7. after the humidity in the foundation soft soil reaches requirements set by the test, various sensors embedded in the foundation soft soil are used to collect and record the data of the test process, and data recorded before and after drainage are compared and analyzed; and s8. after the completion of the test, the subgrade soil, foundation soft soil, and various sensors are removed layer by layer from top to bottom, and the unit model box system is disassembled.

14. A test method using the pile-supported embankment model test device under the action of rainfall and dry-wet cycle according to claim 5, comprising following steps:

s1. a plurality of pile bodies are evenly arranged in the bottom plate of model box, and a pile strain gauge is evenly arranged on both sides of the pile body;

s2. based on the bottom plate of model box, the unit body of model box is installed, foundation soft soil or subgrade soil is filled in an enclosed space, and a TDR probe sensor, an earth pressure box, and a pore water pressure sensor are arranged;

s3. after the subgrade soil, the foundation soft soil, and various sensors are arranged, water is injected from a drainage system set at a bottom of a side of the unit model box system to simulate a groundwater level of the foundation soft soil in a model box;

s4. after groundwater is injected and stood for a period of time, the inlet valve of the rainfall control device is opened and a rainfall intensity is controlled according to the pressure gauge, and then the rainfall control valve is opened to realize a simultaneous drainage of each rainfall hole to simulate a rainfall process;

s5. after a simulation of the rainfall process and a period of time, when rainwater infiltrates into the foundation soft soil and reaches a water level condition of a test, data of a test process are collected and recorded by various sensors embedded in the foundation soft soil;

s6. opening a drainage system of the unit model box system, discharging water in the foundation soft soil, and adjusting a height of the telescopic pole, using the voltage control device to provide voltage for the resistance wire to dry the foundation soft soil, and using a dehumidifier to adjust humidity in the unit model box system; and s7. after the humidity in the foundation soft soil reaches requirements set by the test, various sensors embedded in the foundation soft soil are used to collect and record the data of the test process, and data recorded before and after drainage are compared and analyzed; and s8. after the completion of the test, the subgrade soil, foundation soft soil, and various sensors are removed layer by layer from top to bottom, and the unit model box system is disassembled.

15. A test method using the pile-supported embankment model test device under the action of rainfall and dry-wet cycle according to claim 6, comprising following steps:

s1. a plurality of pile bodies are evenly arranged in the bottom plate of model box, and a pile strain gauge is evenly arranged on both sides of each pile body;

s2. based on the bottom plate of model box, the unit body of model box is installed, foundation soft soil or subgrade soil is filled in an enclosed space, and a TDR probe sensor, an earth pressure box, and a pore water pressure sensor are arranged;

s3. after the subgrade soil, the foundation soft soil, and various sensors are arranged, water is injected from a drainage system set at a bottom of a side of the unit model box system to simulate a groundwater level of the foundation soft soil in a model box;

s4. after groundwater is injected and stood for a period of time, the inlet valve of the rainfall control device is opened and a rainfall intensity is controlled according to the pressure gauge, and then the rainfall control valve is opened to realize a simultaneous drainage of each rainfall hole to simulate a rainfall process;

s5. after a simulation of the rainfall process and a period of time, when rainwater infiltrates into the foundation soft soil and reaches a water level condition of a test, data of a test process are collected and recorded by various sensors embedded in the foundation soft soil;

s6. opening a drainage system of the unit model box system, discharging water in the foundation soft soil, and adjusting a height of the telescopic pole, using the voltage control device to provide voltage for the resistance wire to dry the foundation soft soil, and using a dehumidifier to adjust humidity in the unit model box system; and s7. after the humidity in the foundation soft soil reaches requirements set by the test, various sensors embedded in the foundation soft soil are used to collect and record the data of the test process, and data recorded before and after drainage are compared and analyzed; and s8. after the completion of the test, the subgrade soil, foundation soft soil, and various sensors are removed layer by layer from top to bottom, and the unit model box system is disassembled.

\* \* \* \* \*